UNITED STATES PATENT OFFICE.

GEORG FRIEDRICH LEBIODA, OF BOULOGNE, FRANCE.

PROCESS OF PRESERVING WOOD.

SPECIFICATION forming part of Letters Patent No. 660,756, dated October 30, 1900.

Application filed November 14, 1899. Serial No. 736,968. (No specimens.)

*To all whom it may concern:*

Be it known that I, GEORG FRIEDRICH LEBIODA, a subject of the King of Prussia, German Emperor, residing at the city of Boulogne-sur-Seine, in the Republic of France, have invented certain new and useful Improvements in Processes of Preserving Wood, of which the following is a full, clear, and exact description.

This invention relates to a process for preserving wood. In this process the formaldehyde forms, with the albuminous substances already contained in the wood, insoluble compounds which resist any attacks of insects and destroy in a thoroughly effective manner all germs and spores of bacteria and fungi, also worms, insects, and their larvæ, so that wood treated by the present process is permanently protected against decomposition and decay.

In woods which contain much albumen a treatment with formaldehyde alone is sufficient, because the formaldehyde forms insoluble compounds with the substances contained in the natural sap of the wood. In those woods which contain too small an amount of albuminous substances and the like it is, on the other hand, necessary to introduce into the wood large quantities of such substances simultaneously with the formaldehyde. For this object gelose or agar-agar and any substances which contain chondrin or soluble albuminous substances are particularly suitable. The saturation of the wood with the antiseptic liquid may be effected in various ways—for instance, by sprinkling, immersion, impregnation under high pressure, or in any other suitable manner. Those apparatuses which allow of an impregnation of the wood in the direction of its longitudinal grain are particularly suitable.

By the present invention albuminous substances and the like contained in the natural sap of the woods, which, as is well known, form the ground of all fermentation and decomposition in the same, are not removed from the wood; but they are actually utilized to form in the wood itself insoluble compounds with the formaldehyde introduced. In case a sufficient quantity of such substances does not exist in the natural sap of any wood further quantities of the same must be introduced in order to obtain a sufficient quantity of insoluble compounds in the wood.

The antiseptic liquid employed in the present invention consists of a mixture of dilute solutions of formaldehyde with gelose (agar-agar) or other substances which contain chondrin or albumen. These substances are also employed in proportions of from one-half to three per cent. By using such solutions substances are formed, after the drying, which contain the formaldehyde in chemical combination and which are entirely insoluble in water. The agar-agar or its substitute is dissolved in warm water, and when thoroughly dissolved the formaldehyde is added thereto. The solution so obtained may be used in a cold or in a hot condition. If it be only desired to protect the surface of the wood, it is sufficient to sprinkle it with a brush or to spread the substance thereon with a brush; but if the wood is to be protected right through it is immersed in the liquid or injectors are employed, the duration of the bath being regulated according to the constitution of the wood.

The mixture of formaldehyde solution with agar-agar forms a protecting layer around fiber of the wood when the layer is dried, each which layer is entirely insoluble in water and resists all microbes or parasites. The woods thus treated are rendered almost unlimitedly durable and may in consequence be exposed to rain, sun or air, or fixed in damp or swampy ground.

The use of agar-agar for introducing the formaldehyde into the wood affords very especial advantages. The respective capacity of agar-agar is about ten times that of gelatin. One portion of agar-agar can absorb five hundred parts of water itself without the mixture becoming liquid at ordinary temperature. A paste of agar-agar evaporated to dryness obstinately retains a portion of its water.

If formaldehyde be added to a dilute solution of agar-agar, no deposit is at first formed; but the mass remaining after the evaporation and which is formed from the combination with formaldehyde is a body which is entirely insoluble in water. If the drying be complete in consequence of prolonged heating to 110°, the residue will be entirely insoluble, If, however, the drying be carried out under 100°, the residue will apparently be insoluble in water; but in reality a portion of it gives up the liquid when in a large quantity of water, which absorbs the surplus formaldehyde. Thus the uncombined formaldehyde may be washed out by large quantities of water. If the washings be continued with fresh water, a thoroughly insoluble residue is finally obtained. For instance, if railway-sleepers be saturated with the solution and dried with air or under moderate heat the insoluble antiseptic substance is deposited in the pores, which substance protects the sleepers against any attack of parasites and the like. If such sleepers be then placed in contact with damp earth, they constantly give off a portion of the formaldehyde to the latter, so that an antiseptic medium is formed around the sleepers, which thus forms a second protective layer. The complete drying of the wood after the saturation is of course necessary when the wood is intended to lie constantly in water or when it is to be exposed to the air, sun, and rain.

The hereinbefore-described process for preserving wood by saturation with formaldehyde is cheaper and more effective than the treatment with creosote and other liquids hitherto employed. The improved process is of very particular importance for preserving railway-sleepers, especially for railway post and telegraph appliances; also, for ships and marine constructions, vehicles, piles, foundations for bridges and dams, and mining; also, posts and railings or framework of all kinds, wood floorings, fencings, wood pipes, and the like.

The use of this improved process is especially valuable for tropical countries, where wood otherwise, as is well known, is destroyed in a very short time by the termites or white ants.

Having now described my invention, what I claim as new, and desire to secure by Letters Patent, is—

The process for the preservation of wood by impregnation with a mixture of aqueous solutions of formaldehyde and gelose (agar-agar), substantially as described.

In witness whereof I have hereunto set my hand in presence of two witnesses.

GEORG FRIEDRICH LEBIODA.

Witnesses:
L. MARTIXNAUX,
ERNEST COSENSNA.